US011176911B2

(12) United States Patent
Nishibe et al.

(10) Patent No.: US 11,176,911 B2
(45) Date of Patent: Nov. 16, 2021

(54) INFORMATION PROCESSING APPARATUS, INFORMATION PROCESSING METHOD, PROGRAM, AND HEAD-MOUNTED DISPLAY

(71) Applicant: SONY CORPORATION, Tokyo (JP)

(72) Inventors: Mitsuru Nishibe, Chiba (JP); Atsushi Ishihara, Kanagawa (JP); Hiroyuki Aga, Tokyo (JP); Koichi Kawasaki, Tokyo (JP); Takuya Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/040,801

(22) PCT Filed: Jan. 29, 2019

(86) PCT No.: PCT/JP2019/002907
§ 371 (c)(1),
(2) Date: Sep. 23, 2020

(87) PCT Pub. No.: WO2019/187598
PCT Pub. Date: Oct. 3, 2019

(65) Prior Publication Data
US 2021/0012756 A1 Jan. 14, 2021

(30) Foreign Application Priority Data

Mar. 30, 2018 (JP) .............................. JP2018-068010

(51) Int. Cl.
*G09G 5/38* (2006.01)
(52) U.S. Cl.
CPC ....... *G09G 5/38* (2013.01); *G09G 2340/0464* (2013.01); *G09G 2340/14* (2013.01)

(58) Field of Classification Search
CPC ... G09G 5/38; G09G 2340/0464; G02B 27/02
See application file for complete search history.

(56) References Cited

U.S. PATENT DOCUMENTS

2014/0184641 A1* 7/2014 Naganawa ............. G09G 5/377
345/629

FOREIGN PATENT DOCUMENTS

WO WO-2013124913 A1 * 8/2013 ............. G09G 3/346

OTHER PUBLICATIONS

English Translation of WO-2013124913-A1 (Year: 2013).*

* cited by examiner

*Primary Examiner* — Samantha (Yuehan) Wang
(74) *Attorney, Agent, or Firm* — Paratus Law Group, PLLC

(57) ABSTRACT

There is provided an information processing apparatus capable of displaying an image properly even if an orientation of a display device is rapidly changed, an information processing method, a program, and a head-mounted display. An information processing apparatus for controlling a display section configured to be capable of displaying an image in a displayable area preset in a space by a sequential scanning method includes a setting section and a determination section. The setting section sets the displayable area so as to remain at a certain position in the space. The determination section acquires information about a posture of the display section, calculates a moving direction of the displayable area as viewed from the display section along with a change in the posture of the display section, and determines a main scanning direction of the display section in a direction opposite to the moving direction.

6 Claims, 5 Drawing Sheets

INFORMATION PROCESSING APPARATUS, INFORMATION PROCESSING METHOD, PROGRAM, AND HEAD-MOUNTED DISPLAY

CROSS REFERENCE TO PRIOR APPLICATION

This application is a National Stage Patent Application of PCT International Patent Application No. PCT/JP2019/002907 (filed on Jan. 29, 2019) under 35 U.S.C. § 371, which claims priority to Japanese Patent Application No. 2018-068010 (filed on Mar. 30, 2018), which are all hereby incorporated by reference in their entirety.

TECHNICAL FIELD

The present technology relates to an information processing apparatus for controlling a display device whose posture is changed, an information processing method, a program, and a head-mounted display.

BACKGROUND ART

In the related art, as a display device for displaying an image, there are an OLED (organic light emitting diode) display, an LCD (liquid crystal display), a DMD (digital micro device), and the like. As an image display system by these display devices, there are mainly a sequential scanning method and a global light emission system. Whereas the global light emission method is a method of reading image data for one screen at a time, the sequential scanning method is a method of displaying an image for one screen by sequentially reading out scanning lines by shifting in the vertical direction in which the image data is read out for one pixel at a time in the horizontal direction. The sequential scanning method is adopted in many display devices (see Patent Document 1), and in recent years, a display device by the sequential scanning method may be used worn or carried by a user and used in a mobile device or the like (see Patent Document 2).

CITATION LIST

Patent Literature

Patent Literature 1: Japanese Patent Application Laid-open No. 2015-504628
Patent Literature 2: 2006-337771

DISCLOSURE OF INVENTION

Technical Problem

However, in the sequential scanning method, there is a problem that an image is not properly displayed when an orientation of the display device rapidly is changed due to a movement of the user wearing the display device.

In view of the above circumstances, an object of the present technology is to provide an information processing apparatus capable of displaying an image properly even if an orientation of a display device is changed rapidly, an information processing method, a program, and a head-mounted display.

Solution to Problem

In order to achieve the above-described object, according to an embodiment of the present technology, an information processing apparatus for controlling a display section configured to be capable of displaying an image in a displayable area preset in a space by a sequential scanning method includes a setting section and a determination section.

The setting section sets the displayable area so as to remain at a certain position in the space.

The determination section acquires information about a posture of the display section, calculates a moving direction of the displayable area as viewed from the display section along with a change in the posture of the display section, and determines a main scanning direction of the display section in a direction opposite to the moving direction.

In a display section that displays an image in a displayable area set at a specific position in a space by a sequential scanning method, in a case where the posture of the display section is rapidly changed, the displayable area may be reduced and the image may not be properly displayed.

According to this configuration, the information processing apparatus can determine a main scanning direction of the display section in accordance with a change in the posture of the display section so that the displayable area is not reduced. As a result, the image can be accommodated in the displayable area, and the image can be appropriately displayed.

The information processing apparatus may further include a detection section configured to be capable of detecting the change in the posture of the display section, and the determination section may acquire the change in the posture of the display section detected by the detection section.

The detection section may include an IMU provided in the display section.

According to an embodiment of the present technology, an information processing method of controlling a display section configured to be capable of displaying an image in a displayable area preset in a space by a sequential scanning method includes
setting the displayable area so as to remain at a certain position in the space,
acquiring information about a posture of the display section, calculating a moving direction of the displayable area as viewed from the display section along with the change in the posture of the display section, and
determining the main scanning direction of the display section in a direction opposite to the moving direction.

A program according to an embodiment of the technology causes an information processing apparatus for controlling a display section configured to display images in a displayable area preset in a space by a sequential scanning method to perform
setting the displayable area so as to remain at a certain position in the space,
acquiring information about a posture of the display section, calculating a moving direction of the displayable area as viewed from the display section along with the change in the posture of the display section, and determining the main scanning direction of the display section in a direction opposite to the moving direction.

A head-mounted display according to an embodiment of the present technology includes a wearing section, a display section, and a control section.

The wearing section is configured to be wearable on a head of a user.

The display section is provided in the wearing section, and is configured to be capable of displaying an image in a displayable area preset in a space by a sequential scanning method.

The control section includes a setting section for setting the displayable area so as to remain at a certain position in the space, and a determination section for acquiring information about the posture of the display section, calculating the moving direction of the displayable area as viewed from the display section along with the change in the posture of the display section, and determining the main scanning direction of the display section in a direction opposite to the moving direction.

Advantageous Effects of Invention

As described above, according to the present technology, it is possible to provide an information processing apparatus capable of appropriately displaying an image even if the orientation of the display device is changed rapidly, an information processing method, a program, and a head-mounted display.

MODES FOR CARRYING OUT THE INVENTION

Hereinafter, embodiments of the present disclosure will be described with reference to the drawings.

<Information Processing Apparatus>
[Outline]

An information processing apparatus 1 according to an embodiment of the present technology enables an image to be appropriately displayed in a displayable area even if a posture of a display device is rapidly changed in the display device displaying the image by a sequential scanning method.

As an example, an outline of an AR display spectacle type device using the information processing apparatus 1 of the present embodiment will be described below. The AR display spectacle device has a sequential scanning type display section 13 (see FIG. 2).

Note that the AR display spectacle-type device is a spectacle-type device which is configured to be wearable on a head of a user and is capable of displaying an AR (Augmented Reality) image to the user by the display section 13.

Figure 1:
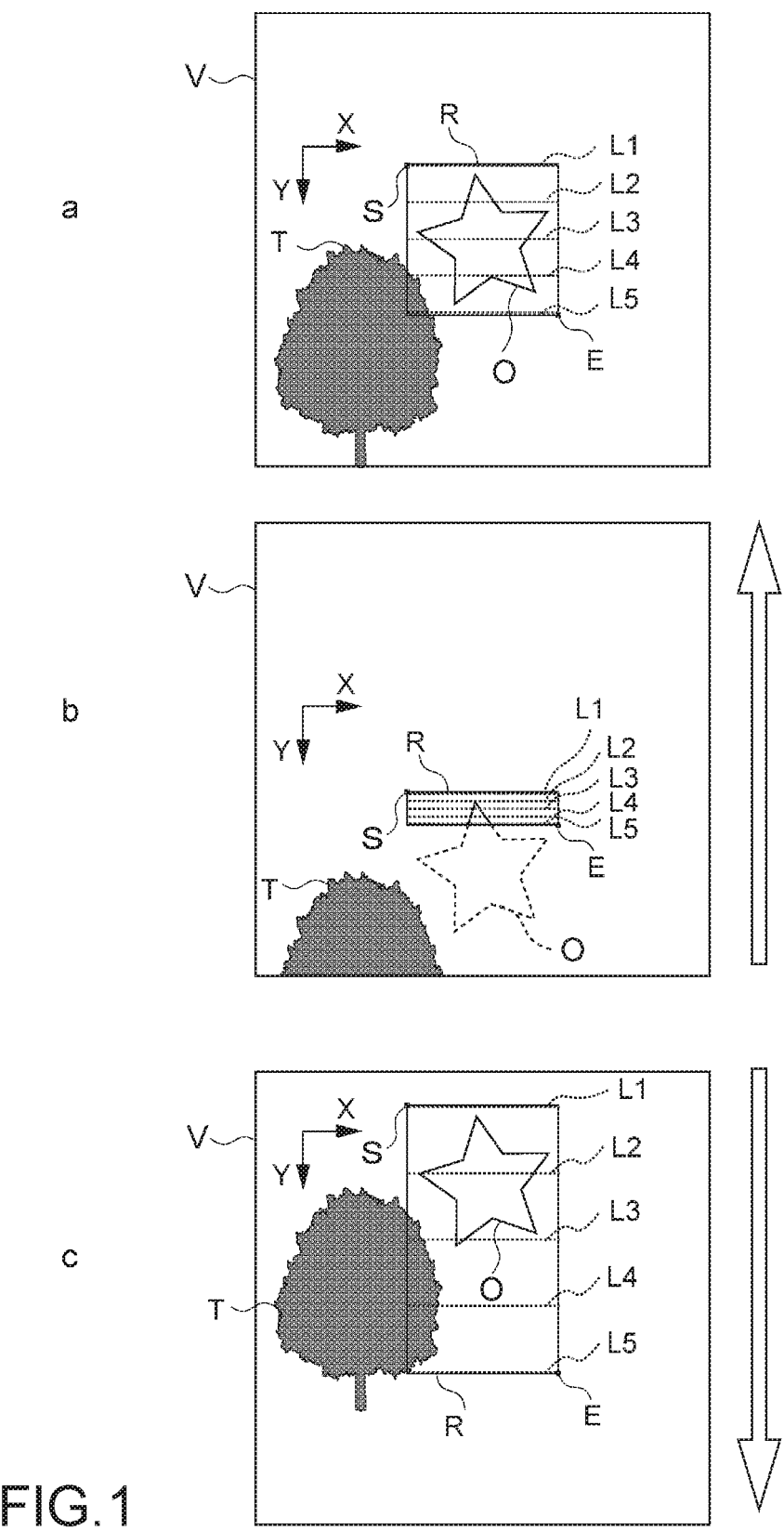
FIG. 1 is a simplified diagram for explaining a change in an orientation of an AR display spectacle type device is rapidly changed.

FIG. 1 is a simplified diagram for explaining a change in a displayable area R when the posture of the AR display spectacle type device is rapidly changed. FIG. 1 shows a field of view V of the user and the displayable area R in which an image can be displayed by the display section 13 of the AR display spectacle type device by the sequential scanning method.

The displayable area R can be set at an arbitrary position in a real space. In the present embodiment, the displayable area R is set so as to remain at a specific position in the real space.

FIG. 1(a) shows a position of the displayable area R in a state where the user wearing the AR display spectacle type device faces a front and is stationary.

As shown in FIG. 1(a), the displayable area R is set at a position obliquely upward to right of a scene tree T in a front direction of the field of view V of the user.

The user can recognize an object O displayed in the displayable area R set at the specific position in the real space and a scene visible transparent in the displayable area R.

The display section 13 is a display having raster data including a plurality of pixels. The display section 13 can display an image in the displayable area R, for example, by emitting a plurality of image display elements arranged in a matrix in the sequential scanning method.

Specifically, as shown in FIG. 1 (a), first, the image display element is made to emit light from an upper left of a scanning start position S of the displayable area R in the right direction (sub-scanning direction X), and the horizontal scanning line L1 is scanned at a predetermined scanning speed. Then, in a direction (main scanning direction Y) perpendicular to the sub-scanning direction X, the horizontal scanning lines L2 to L5 are scanned in order from the top to the bottom in FIG. 1(a), and finally scanned to a scanning end position E in a lower right of the displayable area R. As described above, when the light emission from the scanning start position S to the scanning end position E is completed, the image for one screen is updated and displayed.

FIG. 1(b) shows the displayable area R when the user wearing the AR display spectacle type device rapidly looks up.

When the user wearing the AR display spectacle type device looks up, the orientation of the AR display spectacle type device tilts in the elevation direction, and the field of view V of the user moves upward. In FIG. 1(b), an upward arrow indicates the moving direction of the field of view V of the user.

At this time, since the position of the tree T in the real space does not change, the position of the tree T appears to move downward in the field of view V of the user. In addition, since the display section 13 keeps the position of the object O at a position obliquely upward to the right of the tree T, the position of the displayable area R (object O) also appears to move downward in the field of view V of the user, as shown in FIG. 1(b).

Therefore, when the field of view V of the user moves upward before the scanning for one screen is completed, the scanning start position S appears to move downward in the field of view V of the user, but the scanning end position Eb moves in the opposite direction (upward direction) to the moving direction of the scanning start position S (displayable area R) of the user in accordance with the moving direction of the field of view V of the user.

As a result, in the displayable area R, the scanning distance in the main scanning direction Y is shortened, and each interval between the horizontal scanning lines L1 to L5 becomes dense.

In this manner, the displayable area R is narrowed, and as shown in FIG. 1(b), the object O is not accommodated in the displayable area R but partly cut off, and the object O is not properly displayed in the displayable area R.

FIG. 1(c) shows the displayable area R when the user wearing the AR display spectacle type device rapidly looks down.

When the user wearing the AR display spectacle type device looks down, the orientation of the AR display spectacle type device tilts in a depression angle direction, and the field of view V of the user moves in the downward direction. In FIG. 1(c), a downward arrow indicates the moving direction of the field of view V of the user.

At this time, since the position of the scene tree T in the field of view V of the user does not change, the position of the tree T appears to move upward in the field of view V of the user. In addition, since the display section 13 causes the position of the object O to remain at a position obliquely upward to the right of the tree T, the position of the displayable area R appears to move upward in the field of view V of the user, as shown in FIG. 1(c).

Therefore, when the field of view V of the user moves downward before the scanning for one screen is completed, the scanning start position S appears to move upward in the field of view V of the user, but the scanning end position E moves in a direction (downward) opposite to the moving direction of the scanning start position S (displayable area R) in accordance with the moving direction of the field of view V.

As a result, in the displayable area R, the scanning distance in the main scanning direction Y becomes longer, and each interval between the horizontal scanning lines L1 to L5 becomes sparse.

In this manner, the displayable area R becomes wide, and as shown in FIG. 1(c), the object O fits in the displayable area R, so that the object O can be properly displayed without being cut off in the displayable area R.

Thus, when the field of view V of the user moves upward (see FIG. 1(b)), the displayable area R shrinks and the object O is not properly displayed, whereas when the field of view V of the user moves downward (see FIG. 1(c)), the displayable area R expands and the object O is properly displayed.

That is, the object O may not be properly displayed due to a combination of the main scanning direction Y of the display section 13 and the change in the posture of the user wearing the AR display spectacle-type device.

On the other hand, in the present technique, the above-described problem is prevented by changing the main scanning direction Y of the display section 13 in accordance with the change in the posture of the user.

Specifically, in the present technique, as shown in FIG. 1(b), when the position of the displayable area R in the field of view V of the user moves from the top to the bottom direction, the main scanning direction Y of the display section 13 is changed to the up direction. As a result, the displayable area R is expanded in the same manner as shown in FIG. 1 (c), so that the object O can be appropriately displayed.

In addition, when the position of the displayable area R in the field of view V of the user is moved from the bottom to the upper direction, the object O can be appropriately displayed if the main scanning direction Y of the display section 13 remains downward.

Thus, the information processing apparatus 1 according to the present embodiment determines the main scanning direction of the display section 13 so as to be opposite to the moving direction of the displayable area R (i.e., viewed from AR display glasses device) in the field of view V of the user, and controls the display section 13.

As a result, even if the posture of the display device is rapidly changed, the image can be properly displayed without reducing the displayable area R.

A basic configuration of the information processing apparatus 1 of the present embodiment will be described below.

[Basic Configuration]

Figure 2:
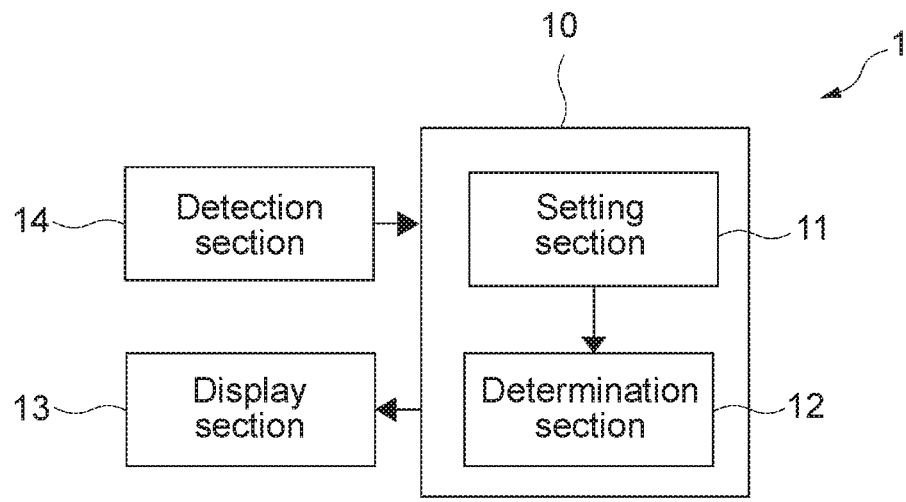
FIG. 2 is a block diagram showing a configuration of an information processing apparatus 1 of the present embodiment.

FIG. 2 is a block diagram showing the configuration of the information processing apparatus 1 of the present embodiment.

The information processing apparatus 1 includes a control section 10, a display section 13, and a detection section 14.

The control section 10 is connected to the display section 13 and the detection section 14.

Note that the display section 13 and the detection section 14 may be external configurations of the information processing apparatus 1.

The display section 13 according to the present embodiment is capable of displaying an image by the sequential scanning method under a control of the control section 10. Further, the display section 13 is configured to be switchable between the main scanning directions of the scanning line upward and downward.

The display section 13 can be configured as, for example, a laser scanning method display such as an organic light emitting diode (OLED) display, a liquid crystal display (LCD), and a virtual retinal display (VRD).

The display section 13 is typically used as a display device of the AR display spectacle type device, and is arranged at a position facing eyes of the user wearing the AR display spectacle type device. Therefore, the posture of the display section 13 is changed in accordance with a change in an orientation of the head of the user wearing the AR display spectacle type device.

The detection section 14 according to the present embodiment is provided in the display section 13, and is configured to be capable of detecting the change in the posture of the display section 13. The detection section 14 can detect a posture angle of the display section 13, for example, in accordance with the change in the orientation of the head of the user, and can detect a change in the angle in the vertical direction (elevation and depression angles) with respect to the horizontal plane of at least the display section 13.

The detection section 14 can be a motion sensor such as an angular velocity sensor and an acceleration sensor, a configuration in combination with these, or a configuration in combination with these and a geomagnetic sensor. In this case, the detecting section 14 may be configured by a sensor unit in which each of the angular velocity sensor and the acceleration sensor is arranged in the three axial directions, or the sensors used may be different in accordance with each axis.

The control section 10 according to the present embodiment includes a setting section 11 and a determination section 12.

The setting section 11 is connected to the determining section 12. The setting section 11 and the determination section 12 will be described later.

FIG. 2 is a flowchart showing an information processing method by the information processing apparatus 1 according to the present embodiment.

Hereinafter, actions (Steps S11 to S14) of the information processing method according to the present embodiment will be described with reference to FIG. 2.

(S11: Setting of Displayable Area)

In Step S11, the setting section 11 of the control section 10 sets the displayable area R of the display section 13 so as to remain at a certain position in the space.

The space is a space surrounding the AR display spectacle type device, and may be a real space or a virtual space. For example, the setting section 11 sets the displayable area R at a specific coordinate position in the spatial coordinates.

(S12: Acquisition of Information about Change in Posture of Display Section)

In Step S12, the detection section 14 first detects the change in the posture of the display section 13 along with the change in the orientation of the head of the user wearing the AR display spectacle-type device. Next, the determination section 12 acquires information about the change in the posture of the display section 13 from the detection section 14.

(S13: Calculation of Moving Direction of Displayable Area)

In Step S13, the determination section 12 calculates the moving direction of the displayable area R as viewed from the display section 13 along with the change in the posture of the display section 13 on the basis of the information about the position in the space of the displayable area R set in Step S11 and the information about the change in the posture of the display section 13 detected in Step S12.

The moving direction of the displayable area R as viewed from the display section 13 corresponds to the moving direction of the displayable area R in the field of view V of the user wearing the AR display spectacle type device.

(S14: Determination of Main Scanning Direction of Display Section)

In Step S14, the determination section 12 determines the main scanning direction of the display section 13. More specifically, it is determined in a direction opposite to the moving direction of the displayable area R calculated in Step S13. For example, in a case where the displayable area R moves from the top to the bottom in the field of view V of the user wearing the AR display glasses device, the determination section 12 determines the main scanning direction of the display section 13 to be upward. Further, in a case where the displayable area R moves from the bottom to the top, the determination section 12 determines the main scanning direction of the display section 13 to be downward.

Then, the determination section 12 of the control section 10 controls the driving of the display section 13 so as to display an image in the displayable area R in the determined main scanning direction.

Hereinafter, a specific configuration of the AR display spectacle type device will be described.

[Specific Configuration of AR Display Spectacle Type Device]

A specific configuration of the AR display spectacle type device 100 using the information processing apparatus 1 of the present embodiment will be described below.

Figure 4:
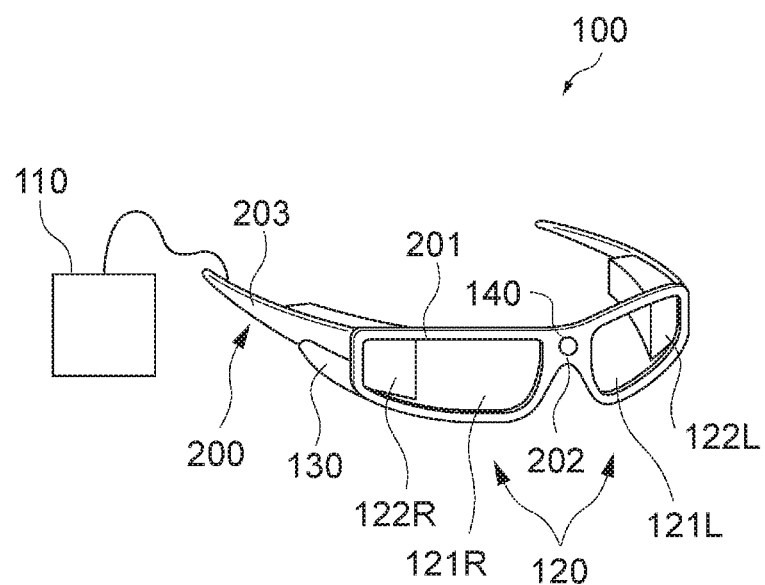
FIG. 4 is a perspective view showing an outline of the AR display spectacle type device using the information processing apparatus.

FIG. 4 is a perspective view showing an outline of the AR display spectacle type device 100 using the information processing apparatus 1 of the present embodiment.

The AR display spectacle type device 100 includes an information processing section 110 and a wearing section 200.

The wearing section 200 includes a display section 120, a sensor 130, and an imaging section 140.

The information processing section 110 is configured to realize a function of the information processing apparatus 1 according to the present embodiment shown in FIG. 2.

The information processing section 110 is connected by wired or wireless connection with the display section 120, the sensor 130, and the imaging section 140 included in the wearing section 200. Also, the information processing section 110 may be integrated with the wearing section 200.

The wearing section 200, as shown in FIG. 4, has a frame including left and right rim portions 201, a bridge portion 202 arranged between the rim portions, temple portions 203 extending backward from each rim portion. This allows the AR display spectacle type device 100 to be worn on the head of the user.

The display section 120 is capable of transmitting visible light, and has a so-called an optical see-through configuration.

The display section 120 includes a display panel 121 and an optical unit 122.

The display plate 121 has display plates 121R and 121L arranged in front of a right eye and a left eye of the user, respectively. The display plates 121R and 121L are configured to be capable of displaying images presented to the left and right eyes of the user. In the present embodiment, the display plates 121R and 121L are made of translucent light guide plates capable of emitting images projected from the optical units 122R and 122L to the right eye and the left eye of the user. Each of the display plates 121R and 121L may be formed of a common member or may be formed of a different member.

The optical units 122R and 122L are configured to be capable of generating images of the displayable area R displayed at a predetermined position of a landscape (real space) seen through the display plates 121R and 121L, respectively.

The optical units 122R and 122L are fixed to a right side edge portion and a left side edge portion of the temple portions 203, respectively, and project a right eye image and a left eye image onto the display plates 121R and 121L, respectively. The structures of the optical units 122R and 122L are not particularly limited as long as they can project images onto the display plates 121R and 121L.

Each of the first and second optical units 122R and 122L includes a display panel section 122a including the image display element, a panel controller 122b for driving the display panel section 122a, an optical prism for projecting the image formed by the image display element onto the display plates 121R, 121L, a cabinet for accommodating these elements, and the like.

A self-emitting panel such as an LED or an organic EL element or a liquid crystal panel may be used as the image display element.

The sensor 130 has a configuration capable of detecting a change in the posture of the display section 120.

The sensor 130 is formed of, for example, an IMU (Inertial Measurement Unit). The IMU has a configuration capable of detecting the change in an angular velocity of the display section 120 around three axes orthogonal to each other, respectively.

The change in the posture of the display section 120 (such as direction of change and amount of change) is obtained by integrating data, for example, of acceleration and the angular velocity measured by the sensor 130.

The change in posture may be calculated by the sensor 130 or the information processing section 110.

Figure 3:
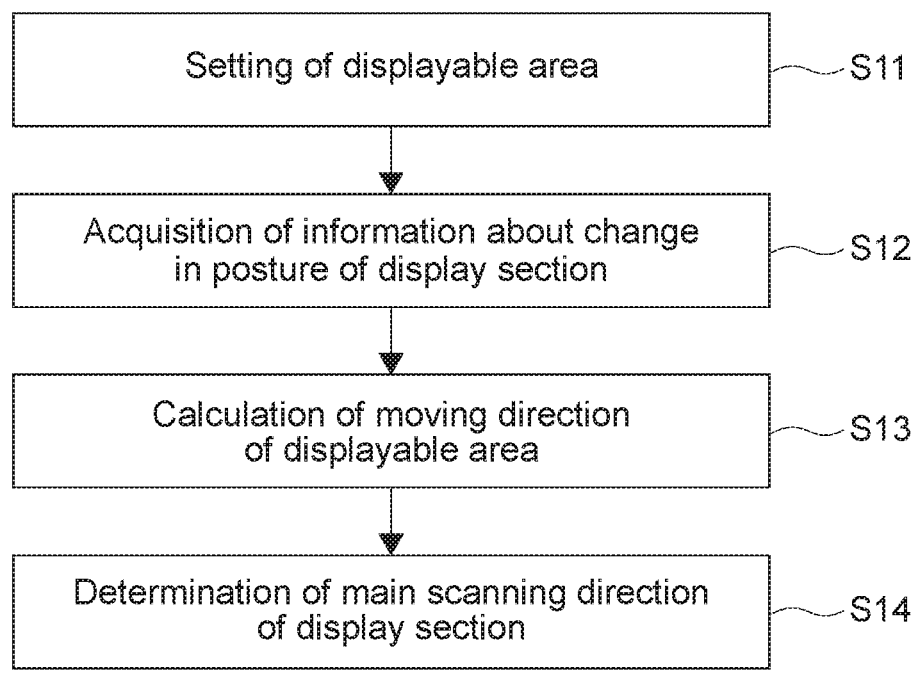
FIG. 3 is a flowchart showing an information processing method by the information processing apparatus.

In addition, although the sensor 130 is arranged on the temple portions 203 of the wearing portion 200 (FIG. 3), the position of the sensor 130 is not particularly limited. The sensor 130 may be arranged on one of the optical units 122R and 122L or a part of the wearing section 200.

The imaging section 140 is typically a camera, and is used to set the position of the displayable area R by an existing self-position estimation technique such as SLAM (Simultaneous Localization and Mapping).

Figure 5:
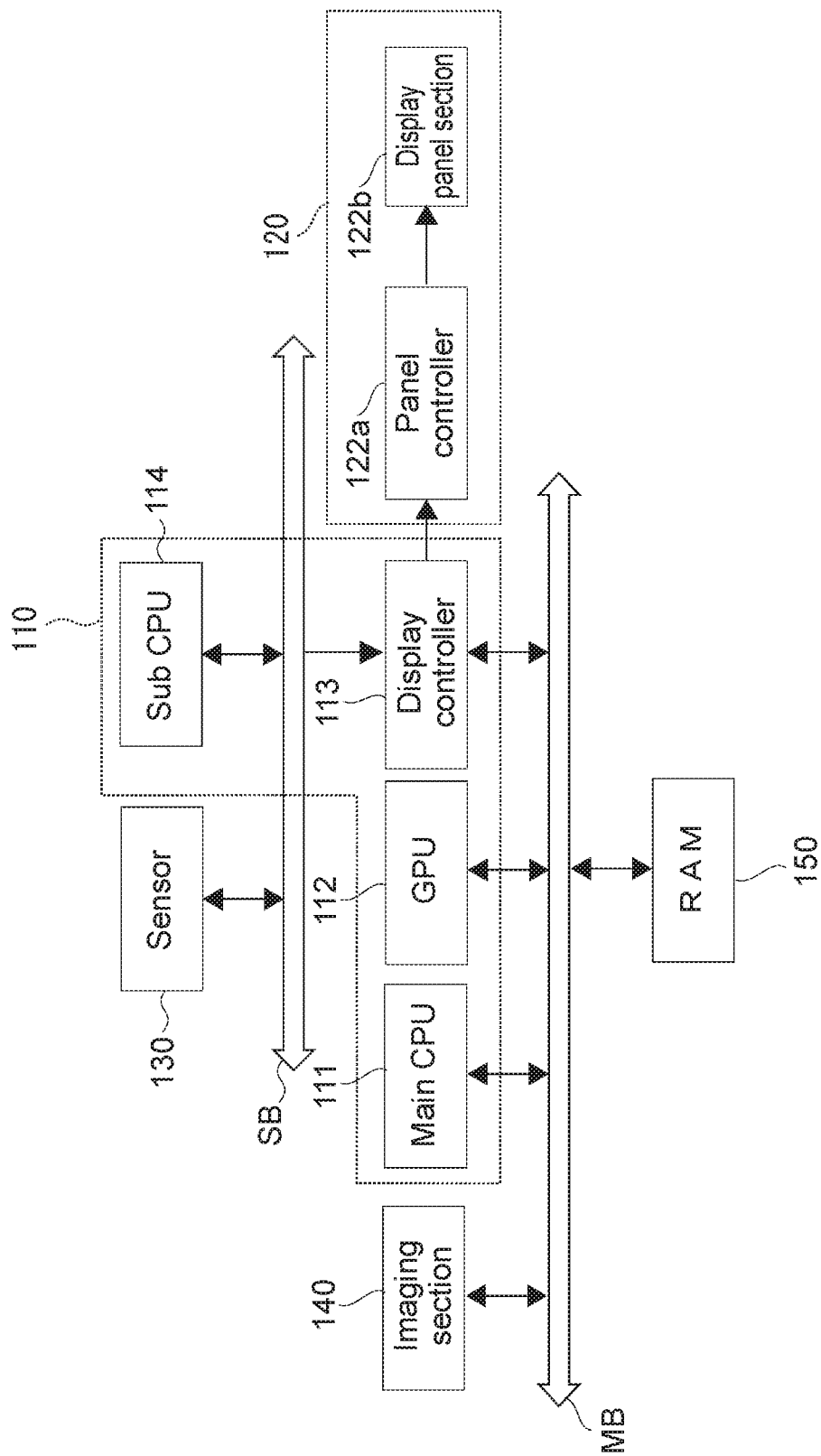
FIG. 5 is a block diagram of each configuration of the AR display spectacle type device using the information processing apparatus.

FIG. 5 is a block diagram of each configuration of the AR display spectacle type device 100 using the information processing apparatus 1 according to the present embodiment.

The AR display spectacle device 100 includes the information processing section 110, the display section 120, the sensor 130, and the imaging section 140.

The sensor 130 and the information processing section 110 are connected via a sub-bus SB.

The imaging section 140 and the information processing section 110 are connected via a main bus MB.

The display section 120 is connected to the information processing section 110.

The information processing section 110 includes a main CPU 111, a GPU 112, a display controller 113, and a sub CPU 114.

The main CPU 111 and the GPU 112 mainly control the images to be displayed in the displayable area R. The main CPU 111 has a function of the setting section 11 of the present embodiment shown in FIG. 2, and can execute SLAM processing or the like in order to set the position of the displayable area R in the real space. For this reason, the main CPU 111 may include a ROM (Read Only Memory) or a RAM (Random Access Memory) for storing a program code for executing the SLAM processing, information about the position and the image of the displayable area R, and other necessary data.

The GPU 112 is mainly used for arithmetic processing for generating 2D and 3D images at high speed.

In addition, the main CPU 111 and GPU 112 are connected to a RAM 150 via the main bus MB, and the generated image data can be stored in the RAM 150 as a frame buffer.

The sub CPU 114 has a function of controlling the main scan direction of the display section 120. That is, the sub CPU 114 has the function of the determining section 12 of the present embodiment shown in FIG. 2.

The display controller 113 is connected to the display section 120, and has a function of controlling the display section 120 based on the output result of the information processing section 110.

Here, the information processing section 110 may include an image correcting section for correcting the image data read out from the RAM 150.

For example, the image correction section is connected to the display control section 112 and may further perform signal processing such as image quality correction on the image signal output from the display control section 112, and may convert it to an image having resolution that matches the screen of the display section 120.

Figure 6:
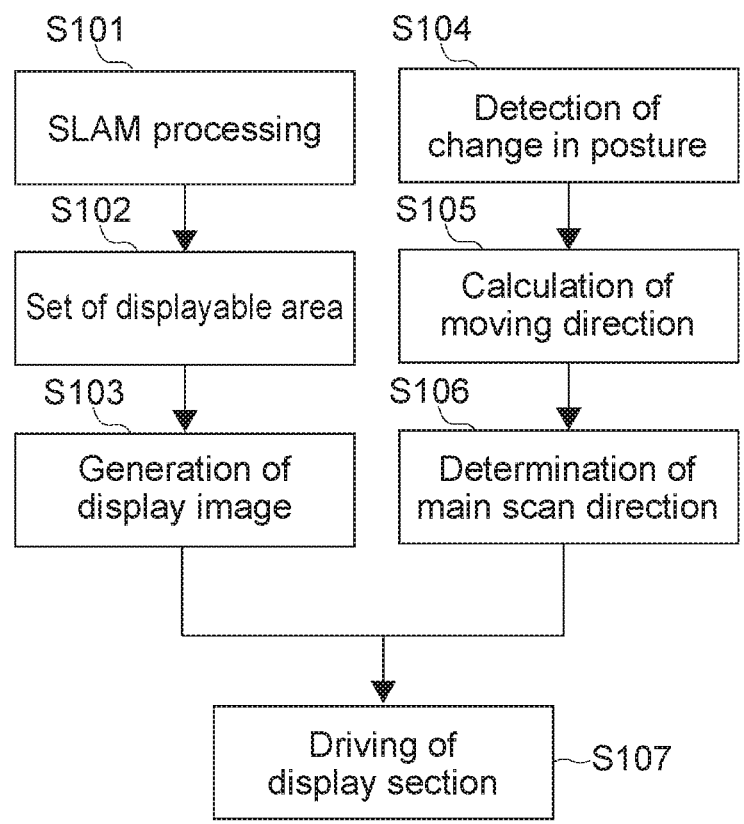
FIG. 6 is a flowchart for explaining actions of each configuration of the AR display spectacle type device using the information processing apparatus.

FIG. 6 is a flowchart for explaining actions of each configuration of the AR display spectacle type device 100 using the information processing apparatus 1 of the present embodiment.

First, Steps S101 to S103 will be described.

In Step S101, the main CPU 111 executes the SLAM processing for simultaneously performing self-position estimation and creation of an environmental map based on the information acquired from the imaging section 140. The main CPU 111 only needs to acquire information about the position of the display section 13 in the real space, and can perform not only the SLAM processing but also the processing using the existing self-position estimation technique.

Next, in Step S102, the main CPU 111 is set such that the displayable area R is positioned at a particular position in the real space using the result of the SLAM processing.

Then, in Step S103, the GPU 112 generates the image to be displayed in the displayable area R. Then, the GPU 112 can write predetermined image data including information about the position of the displayable area R in the space to the RAM 150.

The written image data is transferred from the RAM 150 to the display controller 113 for one line at a time, and the transfer is repeated until one screen reading is completed.

Next, Steps S104 to S106 will be described.

In Step S104, the sensor 130 detects the change in the posture of the display section 120. Step S104 is performed during the so-called V-blank (vertical-retrace period). The V blank refers to a period during which the scanning line is returned from the scanning end position E of the displayable area R to the scanning start position S of the displayable area R in order to start scanning for the next one screen after the scanning of one screen of the displayable area R is completed.

In Step S105, the sub CPU 114 first acquires information about the change in the posture of the display section 120 from the sensor 130. Then, the sub CPU 114 calculates the moving direction of the displayable areas R as seen from the display section 120 along with the change in the posture of the display section 120.

For example, the sub CPU 114 can calculate the moving direction (two-dimensional data) of the displayable area R in the field of view of the user by projecting the direction of the change in the posture (three-dimensional data) of the display section 120 onto a surface of the field of view surface of the user (surface facing user's eyes).

In step S106, the sub CPU 114 determines the main scan direction of the display section 120 on the basis of the moving direction of the displayable area R calculated in Step S105. For example, when the displayable area R is moved from the top to the bottom in the field of view V of the user, the main scanning direction of the display section 120 is turned upward. When the displayable area R is moved from the bottom to the top in the field of view V of the user, the main scanning direction of the display section 120 is turned downward. In this manner, the sub CPU 114 determines the main scan direction of the display section 120 in a direction opposite to the moving direction of the displayable area R.

In Step S107, the display controller 113 acquires the image data including the information about the position of the displayable area R in the real space set in Step S103, and the information about the scanning directions of the scanning lines determined in Step S106.

Then, the display controller 113 controls the display section 120 such that the image is displayed in the displayable area R on the basis of the acquired information.

As a result, the display section 120 displays a predetermined image in the displayable area R set at the specific position in the real space from a predetermined main scanning direction.

OTHER EMBODIMENTS

In the above embodiment, an example in which the information processing apparatus 1 is used in the AR display spectacle type device 100 having the optical see-through type display section 120 has been described, but the present technology is not limited thereto. The information processing apparatus 1 may be applied to other display devices.

More specifically, the present technology may be applied to a non-transmissive display device that displays an image of a virtual space, i.e., a so-called VR image, displayed in association with the position of the real space in the displayable area R.

That is, the present technology is not limited to displaying the virtual image (AR image) in a part of the displayable area R. The virtual image may be displayed on the entire surface of the displayable area R.

In addition, the present technology may be applied to a video see-through type head-mounted display in which the image obtained by superimposing the virtual image on the real space (landscape) acquired by the camera or the like is displayed in the displayable area R.

Furthermore, the present technology may be applied to a mobile projector having a configuration that is rotatable about at least one axis.

That is, in the present technology, the image is displayed by projecting image light from the image display element onto the display panel 121 as in the above embodiment, but not limiting thereto. The image may be displayed by projecting the image light from the image display element onto a three-dimensional space around the user.

In addition, the present technology may be applied not only to the head-mounted display device such as the AR display spectacle type device 100 but also to a hand-held display device. For example, as the hand-held display device, the information processing apparatus 1 of the present embodiment may be applied to a portable terminal having a transmissive or non-transmissive display or a digital binoculars.

The information processing apparatus 1 according to the above embodiment is not limited to the above configuration, and various modifications are possible.

For example, the determination section 12 of the information processing apparatus 1 may be capable of changing the main scanning direction of the display section 13 in an arbitrary direction in accordance with the change in the posture of the display section 13. For example, the determination section 12 may be capable of changing the main scanning direction of the display section 13 in the left-right direction and the oblique direction.

In addition, the information processing apparatus 1 according to the present embodiment may have a configuration in which the scanning speed of the scanning line can be changed. Specifically, by increasing the scanning speed of the scanning lines in the main scanning direction, the frame rate can be increased, and the images can be displayed so as to appear to smoothly connect the images.

The information processing apparatus 1 according to the present embodiment may be configured such that the scanning ranges of the scanning lines can be changed. Specifically, the scanning lines may be scanned only in the area in which the object O of the displayable area R is displayed, and the scanning lines may not be scanned in the area in which the object O of the displayable area R is not displayed. Thus, it is possible to reduce the number of scanning lines to display, it is possible to reduce a power consumption in the driving of the display section 13. In addition, this allows the frame rate to be increased, and the images can be displayed so as to appear to smoothly connect the images.

The information processing apparatus 1 according to the present embodiment may have a configuration in which luminance of the displayable area R can be adjusted in accordance with an extension of the displayable area R.

Specifically, the information processing apparatus 1 according to the present embodiment may perform an action of increasing the luminance of the displayable area R in accordance with the extension of the displayable area R.

Thus, by extending the displayable area R, the density of the scanning lines become sparse, and it is possible to prevent the luminance is lowered.

The detection section 14 may be not necessarily provided in the display section 13. The detection section 14 may be provided in a part other than the display section 13 as the camera capable of imaging the field of view V of the user. That is, the detection section 14 may be configured to be capable of detecting information about the posture of the display section 13 from the imaged image.

The setting section 11 may determine not only determine the main scanning direction on the basis of the change in the posture of the display section 13, but also determine the main scanning direction of the scanning line on the basis of the position of the pupil of the user when the virtual retinal display (VRD) is used.

Also, the effects described herein are illustrative or exemplary only and not restrictive. In other words, the technique according to the present disclosure may have other effects apparent to those skilled in the art from the description herein together with the above effects or in place of the above effects.

The present technology may also have the following structures.

(1)

An information processing apparatus for controlling a display section configured to be capable of displaying an image in a displayable area preset in a space by a sequential scanning method, including:

a setting section that sets the displayable area so as to remain at a certain position in the space; and a determination section that acquires information about a posture of the display section, calculates a moving direction of the displayable area as viewed from the display section along with a change in the posture of the display section, and determines a main scanning direction of the display section in a direction opposite to the moving direction.

(2)

The information processing apparatus according to (1), further including:

a detection section configured to be capable of detecting the change in the posture of the display section, in which the determination section acquires the change in the posture of the display section detected by the detection section.

(3)

The information processing apparatus according to (2), in which the detection section include an IMU provided in the display section.

(4)

An information processing method of controlling a display section configured to be capable of displaying an image in a displayable area preset in a space by a sequential scanning method, including:

setting the displayable area so as to remain at a certain position in the space;

acquiring information about a posture of the display section;

calculating a moving direction of the displayable area as viewed from the display section along with a change in the posture of the display section; and determining a main scanning direction of the display section in a direction opposite to the moving direction.

(5)

A program that causes an information processing apparatus for controlling a display section configured to display images in a displayable area preset in a space by a sequential scanning method to perform:

setting the displayable area so as to remain at a certain position in the space;

acquiring information about a posture of the display section;

calculating a moving direction of the displayable area as viewed from the display section along with a change in the posture of the display section; and determining a main scanning direction of the display section in a direction opposite to the moving direction.

(6)

A head-mounted display, including:

a wearing section configured to be wearable on a head of a user;

a display section provided in the wearing section and configured to be capable of displaying an image in a displayable area preset in a space by a sequential scanning method; and a control section including a setting section for setting the displayable area so as to remain at a certain position in the space, and a determination section for acquiring information about a posture of the display section, calculating a moving direction of the displayable area as viewed from the display section along with a change in the posture of the display section, and determining a main scanning direction of the display section in a direction opposite to the moving direction.

REFERENCE SIGNS LIST 1 information processing apparatus
10 control section
11 setting section
12 determining section
13, 120 display section
14 detection section
100 AR display spectacle type device
110 information processing section
111 main CPU
112 GPU
113 display controller
114 sub CPU
121 display panel
122 optical unit
122a display panel section
122b panel controller
130 sensor
140 imaging section
150 RAM

The invention claimed is:

1. An information processing apparatus for controlling a display section configured to display an image in a displayable area preset in a space by a sequential scanning method, comprising:

a setting section configured to set the displayable area so as to remain at a certain position in the space; and a determination section configured to acquire information about a posture of the display section, calculate a moving direction of the displayable area as viewed from the display section along with a change in the posture of the display section, and determine a main scanning direction of the sequential scanning method of the display section in a direction opposite to the moving direction, wherein the setting section and the determination section are each implemented via at least one processor.

2. The information processing apparatus according to claim 1, further comprising:

a detection section configured to detect the change in the posture of the display section, wherein the determination section acquires the information about the change in the posture of the display section detected by the detection section, and wherein the detection section is implemented via at least one processor.

3. The information processing apparatus according to claim 2, wherein the detection section includes an inertial measurement unit provided in the display section.

4. An information processing method of controlling a display section configured to display an image in a displayable area preset in a space by a sequential scanning method, comprising:

setting the displayable area so as to remain at a certain position in the space;

acquiring information about a posture of the display section;

calculating a moving direction of the displayable area as viewed from the display section along with a change in the posture of the display section; and determining a main scanning direction of the sequential scanning method of the display section in a direction opposite to the moving direction.

5. A non-transitory computer-readable storage medium having embodied thereon a program, which when executed by a computer of an information processing apparatus causes the information processing apparatus to execute a method for controlling a display section configured to display images in a displayable area preset in a space by a sequential scanning method, the method for controlling the display section comprising:

setting the displayable area so as to remain at a certain position in the space;

acquiring information about a posture of the display section;

calculating a moving direction of the displayable area as viewed from the display section along with a change in the posture of the display section; and determining a main scanning direction of the sequential scanning method of the display section in a direction opposite to the moving direction.

6. A head-mounted display, comprising:

a frame configured to be worn on a head of a user;

a display section provided in the frame and configured to display an image in a displayable area preset in a space by a sequential scanning method; and a control section including a setting section for setting the displayable area so as to remain at a certain position in the space, and a determination section for acquiring information about a posture of the display section, calculating a moving direction of the displayable area as viewed from the display section along with a change in the posture of the display section, and determining a main scanning direction of the sequential scanning method of the display section in a direction opposite to the moving direction;

wherein the control section is implemented via at least one processor.

* * * * *